United States Patent
Kim et al.

(10) Patent No.: US 10,481,926 B2
(45) Date of Patent: Nov. 19, 2019

(54) APPARATUS FOR COMPILING SCRIPT

(71) Applicant: LSIS CO., LTD., Gyeonggi-do (KR)

(72) Inventors: Tae-Seop Kim, Gyeonggi-do (KR); Jong-Ho Park, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 36 days.

(21) Appl. No.: 15/614,733

(22) Filed: Jun. 6, 2017

(65) Prior Publication Data

US 2018/0150304 A1    May 31, 2018

(30) Foreign Application Priority Data

Nov. 30, 2016  (KR) .......................... 10-2016-0161156

(51) Int. Cl.
  *G06F 9/44*   (2018.01)
  *G06F 9/448*  (2018.01)
  *G06F 16/22*  (2019.01)

(52) U.S. Cl.
  CPC ........ *G06F 9/4494* (2018.02); *G06F 16/2272* (2019.01)

(58) Field of Classification Search
  CPC ...... G06F 9/4494; G06F 16/2272; G06F 8/41; G06F 8/30; G06F 8/44; G05B 19/418; G05B 2219/23266; G05B 2219/24215
  USPC ....................................................... 717/115
  See application file for complete search history.

(56) References Cited

U.S. PATENT DOCUMENTS

| | | | |
|---|---|---|---|
| 6,819,746 B1 | 11/2004 | Schneider et al. | |
| 9,218,632 B2 | 12/2015 | Venkatakrishnan et al. | |
| 9,362,754 B2 * | 6/2016 | Borrett | G06Q 10/06 |
| 2004/0193329 A1 | 9/2004 | Ransom et al. | |
| 2005/0198630 A1 * | 9/2005 | Tamma | G06F 8/65 |
| | | | 717/175 |
| 2011/0055257 A1 * | 3/2011 | Renkes | G06F 17/30336 |
| | | | 707/769 |
| 2012/0062577 A1 | 3/2012 | Nixon | |

(Continued)

FOREIGN PATENT DOCUMENTS

| | | |
|---|---|---|
| JP | H10232891 A | 9/1998 |
| JP | 2000125189 A | 4/2000 |

(Continued)

OTHER PUBLICATIONS

Korean Office Action for related Korean Application No. 10-2016-0161156; action dated Jun. 11, 2018; (4 pages).

(Continued)

*Primary Examiner* — Anna C Deng
(74) *Attorney, Agent, or Firm* — K&L Gates LLP

(57) ABSTRACT

Disclosed herein is an apparatus for compiling scripts that compiles a script depending on whether an index of power data has been changed. The apparatus for compiling scripts includes: a database configured to store power data acquired from a power system and an index of the power data; a script generating unit configured to generate a script based on the power data stored in the database; a determining unit configured to determine whether the index of the power data stored in the database has been changed; and a compiling unit configured to compile the script generated in the script generating unit by referring to a predetermined instruction based on the determination result.

4 Claims, 7 Drawing Sheets

(56) References Cited

U.S. PATENT DOCUMENTS

| | | | | |
|---|---|---|---|---|
| 2012/0102001 A1* | 4/2012 | Longshaw | .......... | G06F 11/1471 |
| | | | | 707/662 |
| 2012/0317038 A1* | 12/2012 | Erbey | ................ | H04M 3/5183 |
| | | | | 705/304 |
| 2016/0182327 A1 | 6/2016 | Coleman, Jr. et al. | | |
| 2017/0139995 A1* | 5/2017 | Mielenhausen | ... | G06F 17/30292 |

FOREIGN PATENT DOCUMENTS

| JP | 2006302066 A | 11/2006 |
|---|---|---|
| KR | 1020040051023 A | 6/2004 |
| KR | 100468276 B1 | 1/2005 |
| KR | 100934866 B1 | 12/2009 |
| KR | 101310609 B1 | 9/2013 |

OTHER PUBLICATIONS

European Search Report for related European Application No. 17173719.0; report dated Oct. 11, 2017; (7 pages).

* cited by examiner

PRIOR ART

FIG. 5

| POWER DATA | INDEX | VERSION INFORMATION |
|---|---|---|
| DATA 1 | INDEX 1 | VERSION 1 |
| DATA 2 | INDEX 2 | VERSION 2 |
| ⋮ | ⋮ | ⋮ |
| DATA n | INDEX n | VERSION n |

APPARATUS FOR COMPILING SCRIPT

CROSS-REFERENCE TO RELATED APPLICATIONS

This application claims the benefit of Korean Patent Application No. 10-2016-0161156, filed on Nov. 30, 2016, entitled "APPARATUS FOR COMPILING SCRIPT", which is hereby incorporated by reference in its entirety into this application.

BACKGROUND

1. Technical Field

The present disclosure relates to an apparatus for compiling scripts, and more particularly, to an apparatus for compiling scripts that compiles a script depending on whether an index of power data has been changed.

2. Description of the Related Art

A supervisory control and data acquisition (SCADA) system is a large-scale system that processes and monitors a large volume of data and provides a variety of functions associated therewith. In particular, such a SCADA system is frequently employed for controlling a large-scale power system, and an HMI is used to intuitively identify and manage data associated with the power system.

In order to perform various tasks on the HMI, various operation values calculated based on data acquired from the power system are required. The operation values are calculated by various mathematical formulas. A set of such formulas is defined as an operation script.

In order to provide optimal performance, the HMI converts the above-mentioned operation script in a text format that can be easily read by users into a binary format that can be recognized by a machine such as a computer, and registers it with its own server.

Data acquired from the power system is changed whenever equipment for monitoring the power system is added or changed. Previously, when equipment is added or changed, the operation script already registered is cancelled and then a new operation script is registered.

FIG. 1 is a view showing a process of compiling scripts in the related art. Hereinafter, the existing method of compiling scripts will be described in detail with reference to FIG. 1.

Referring to FIG. 1, data acquired from a power system is input through an editor. An operation script in a text format is automatically calculated using the input data and a predetermined mathematical formula.

In doing so, the user loads the calculated operation script and compiles the operation script into a binary format by referring to the index of the data included in the operation script. The user registers the compiled operation script in the binary format with the server to manage it.

However, according to the existing method, whenever the data acquired from the power system is changed, the user has to cancel the script already registered and register new script manually, which is inconvenient.

In addition, according to the existing method, the user has to refer to the index of the changed data by herself/himself, and thus there is a problem that the user may miss the index of the changed data by mistake.

Further, according to the existing method, if the user registered a wrong new operation script such that the user wants to return it to the existing operation script, it is difficult to identify the data and the index of data of the existing operation script.

SUMMARY

It is an object of the present disclosure to provide an apparatus for compiling scripts capable of preventing missing of compiling when power data is changed by compiling a script depending on whether power data and the index of the power data have been changed.

It is another object of the present disclosure to provide an apparatus for compiling scripts capable of compiling scripts automatically by referring to the index of power data and a predetermined instruction to thereby eliminate the inconvenience of the user manually compiling it.

It is yet another object of the present disclosure to provide an apparatus for compiling scripts capable of easily recovering a script by using version information corresponding to power data and the index of the power data.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for compiling scripts includes: a database configured to store power data acquired from a power system and an index of the power data; a script generating unit configured to generate a script based on the power data stored in the database; a determining unit configured to determine whether the index of the power data stored in the database has been changed; and a compiling unit configured to compile the script generated in the script generating unit by referring to a predetermined instruction based on the determination result.

According to an exemplary embodiment of the present disclosure, a script is compiled based on whether or not power data and the index of the power data have been changed, thereby preventing missing of compiling when the power data is changed.

In addition, according to an exemplary embodiment of the present disclosure, a script is automatically compiled by referring to the index of power data and a predetermined instruction, thereby eliminating the inconvenience of the user manually compiling.

According to an exemplary embodiment of the present disclosure, by using version information corresponding to power data and the index of the power data, it is possible to easily recover a script.

BRIEF DESCRIPTION OF DRAWINGS

FIG. 5 is a table showing version information corresponding to power data and index of power data;

DETAILED DESCRIPTION

Figure 1:
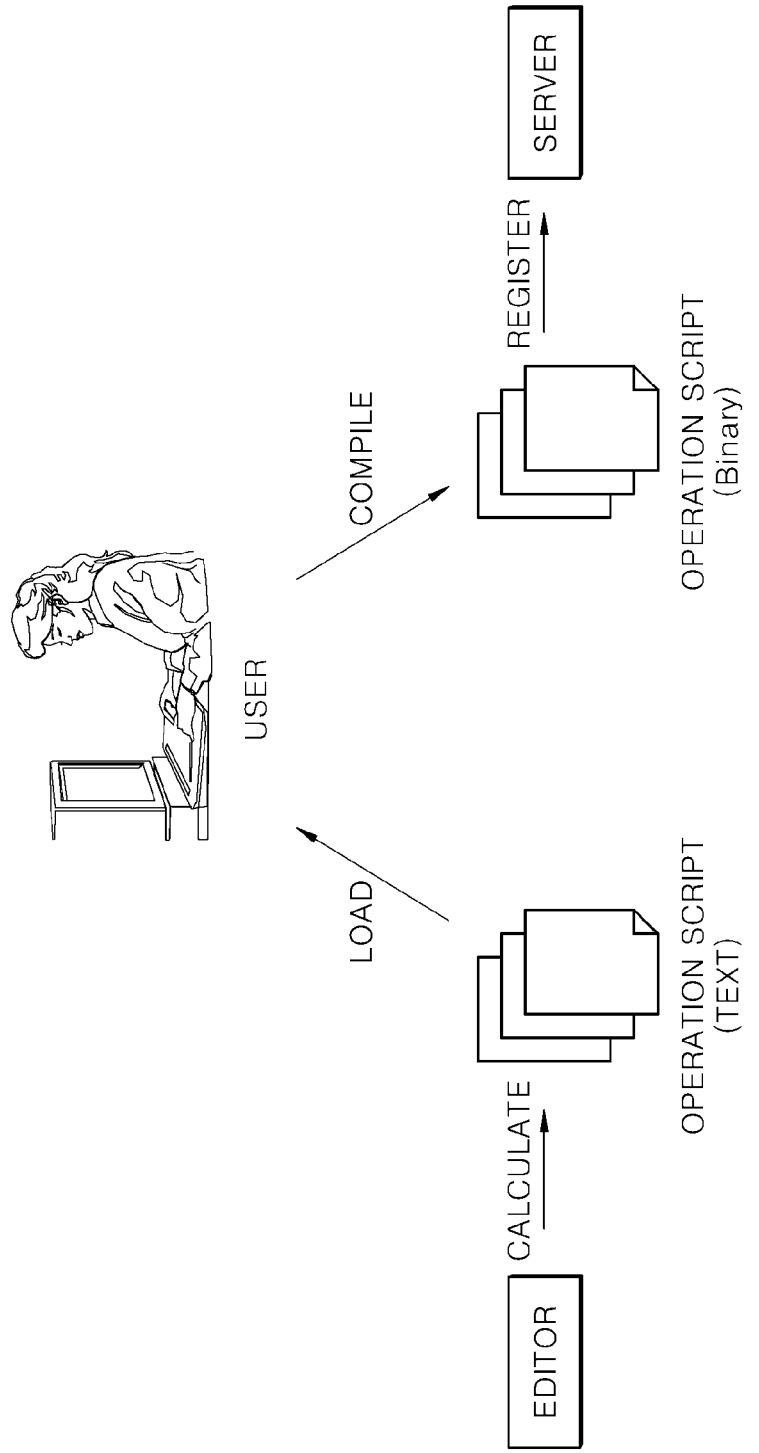
FIG. 1 is a view showing a process of compiling a script in the related art.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 2:
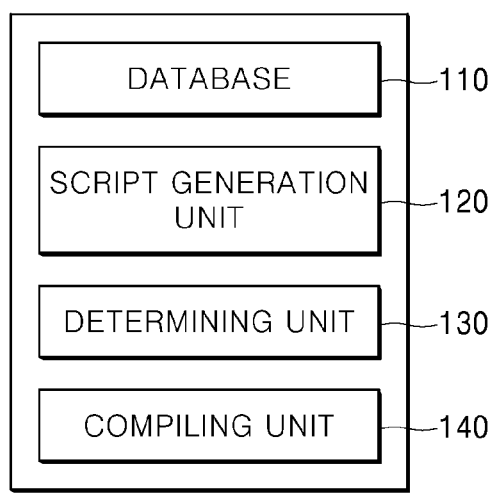
FIG. 2 is a diagram showing an apparatus for compiling a script according to an exemplary embodiment of the present disclosure.

FIG. 2 is a diagram illustrating an apparatus for compiling scripts 100 according to an exemplary embodiment of the present disclosure. Referring to FIG. 2, the apparatus 100 includes a database 110, a script generating unit 120, a determining unit 130, and a compiling unit 140. The apparatus 100 shown in FIG. 2 is merely an exemplary embodiment of the present disclosure, and the elements are not limited to those shown in FIG. 2. Some elements may be added, modified or eliminated as desired.

Figure 3:
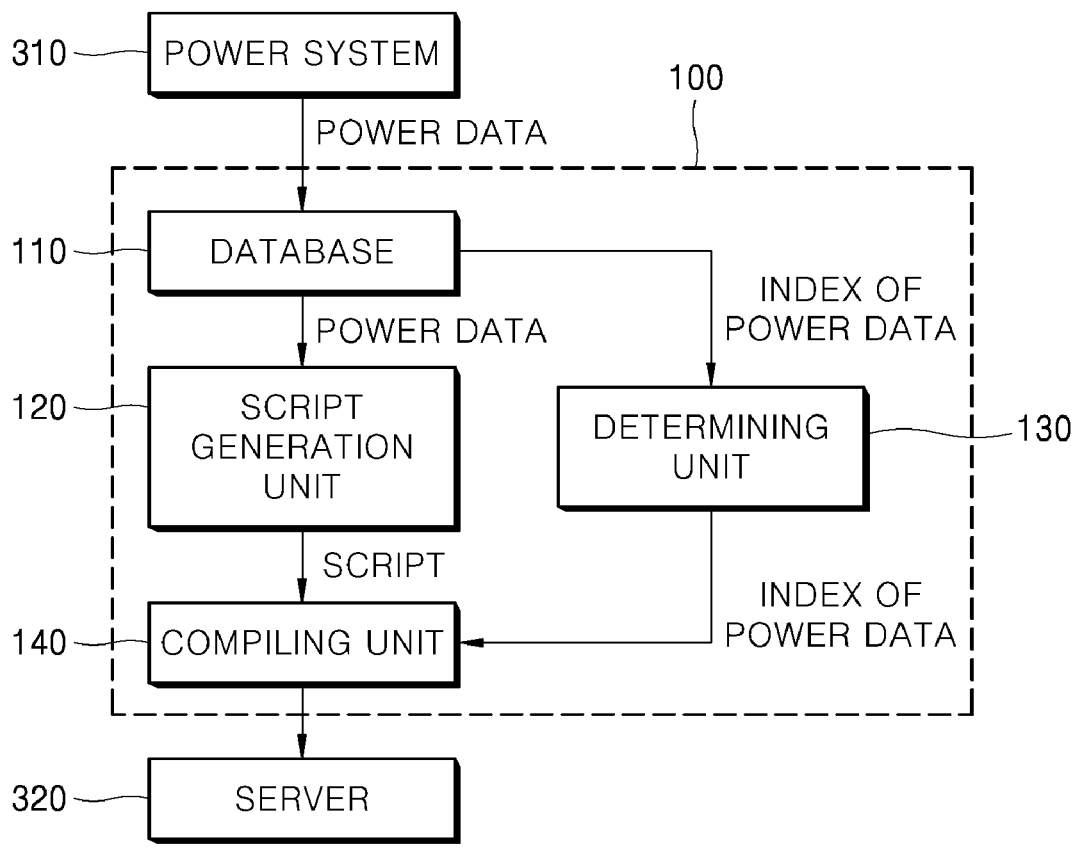
FIG. 3 is a diagram illustrating apparatus according to an exemplary embodiment of the present disclosure connected to a power system and a server.

FIG. 3 is a diagram illustrating apparatus 100 according to an exemplary embodiment of the present disclosure connected to a power system 310 and a server 320. Hereinafter, the apparatus 100 and the database 110, the script generating unit 120, the determining unit 130 and the compiling unit 140 thereof will be described in detail with reference to FIGS. 2 and 3.

Referring to FIG. 3, the database 110 according to the exemplary embodiment of the present disclosure may receive power data obtained from the power system 310. The power system 310 includes a system in which a power plant, a substation, a transmission/distribution line and a load together generate electric power and utilize it. For example, the power system 310 may include all power devices ranging from individual generators operating in the field to systems that make up the entire process.

Power data refers to data relating to the power acquired in the power system 310. For example, the power data may include a voltage value measured at the generator or a consumed current value measured at the load.

This power data may be acquired in various ways. More specifically, when the apparatus is employed in a supervisory control and data acquisition (SCADA) system, power data may be acquired through a remote terminal unit (RTU). The remote terminal unit may be directly connected to a sensor installed in the process, and the remote terminal unit may convert a signal recognized by the sensor into digital data and transmit it to the system.

Also, the power data may be directly input from the user. For example, if a new power system is added to the system and no remote terminal unit is provided to the power system, the user may input power data for the power system by herself/himself. Accordingly, the database 110 may acquire power data through the user's input.

The database 110 according to an exemplary embodiment of the present disclosure may assign an arbitrary index to each of the acquired power data. Accordingly, the database 110 may store power data items and the indexes corresponding to the power data items, respectively. The index may include data indicating the name, size, attribute or log location of power data when the power data is compiled or written into a memory. For example, the index may include information about the value of power data, and the location and the equipment from which the power data is acquired.

Referring again to FIG. 3, the script generating unit 120 according to an exemplary embodiment of the present disclosure may receive the power data stored in the database 110 and may generate a script based on the received power data. The generated script may include instructions written in simple text that can be read by human, rather than a program language recognizable by a computer.

When the apparatus is employed in a SCADA system, the script may be a mathematical formula in a text format written based on the power data. More specifically, the power data may be used to derive an operation value, and the script may be a set of mathematical formulas for deriving the operation value from the power data.

Such a script may be automatically generated using the power data stored in the database 110. For example, the script generating unit 120 may automatically generate a script by substituting the power data retrieved from the database 110 into a predetermined mathematical formula.

The script may also be generated directly from the user. For example, if there is no mathematical formula that constitutes a script, the user may create a script by setting a new formula to entering the power data into the formula.

Referring again to FIG. 3, the determining unit 130 may receive an index of the power data stored in the database 110 to determine whether the index has been changed. For example, in the power system 310 operating based on the SCADA system, the power data may be changed at regular intervals as equipment for monitoring the power system 310 is added or changed. When new power data is added, the database 110 can assign a new index to the power data. Accordingly, the power data and the index of the power data stored in the database 110 may be changed at regular intervals.

If it is determined that the index of power data is changed, the determining unit 130 may send the changed index to the compiling unit 140. On the other hand, if it is determined that the index of the power data has not been changed, the determining unit 130 may send the existing index to the compiling unit 140. The index may be sent by the determining unit 130 or may be sent by the database 110 under the control of the determining unit 130.

Referring again to FIG. 3, the compiling unit 140 according to an exemplary embodiment of the present disclosure may compile a script by referring to a predetermined instruction depending on the determination result. Compiling refers to converting a script written in a language such as text that can be read by human into a language recognizable by a machine such as a computer. For example, a script in the of text generated by the script generating unit 120 may be converted into a binary format by the compiling unit 140.

The instructions may include program instructions used in a program to perform compiling. Accordingly, the user may set an instruction corresponding to a specific program in advance, and may input the predetermined instruction in the form of a lookup table to the compiling unit 140.

If it is determined that the index of the power data has been changed as a result of the determination by the determination unit 130, the compiling unit 140 may compile the generated script by referring to the index of the changed power data. If it is determined that the index of the power data has not been changed as a result of the determination by the determining unit 130, the compiling unit 140 may compile the generated script by referring to the index of the existing power data. In other words, the compiling unit 140 may compile the whole script automatically by referring to the index of the power data stored in the database 110 and the instruction used in the program for compiling.

As described above, according to the exemplary embodiment of the present disclosure, the script is automatically compiled with reference to the index of power data and a predetermined instruction, thereby eliminating the inconvenience of the user manually compiling.

In addition, if it is determined that the index of the power data has been changed as a result of the determination by the determining unit 130, a part of a script that is generated based on the power data with the changed index may be complied by referring to the changed index of the power data.

More specifically, as described above, the script may be a set of mathematical formulas for deriving a computed value from the power data. Accordingly, the set of mathematical formulas constituting the script may include a mathematical formula generated based on the power data with a changed index. In doing so, the compiling unit 140 may compile only the mathematical formula part generated based on the power data with the changed index by referring to the changed index of the power data. In other words, the compiling unit 140 may compile only a part of an already-generated script that needs to be changed.

In this manner, according to an exemplary embodiment of the present disclosure, a script is compiled based on whether or not power data and the index of the power data have been changed, thereby preventing missing of compiling when the power data is changed.

Figure 4:
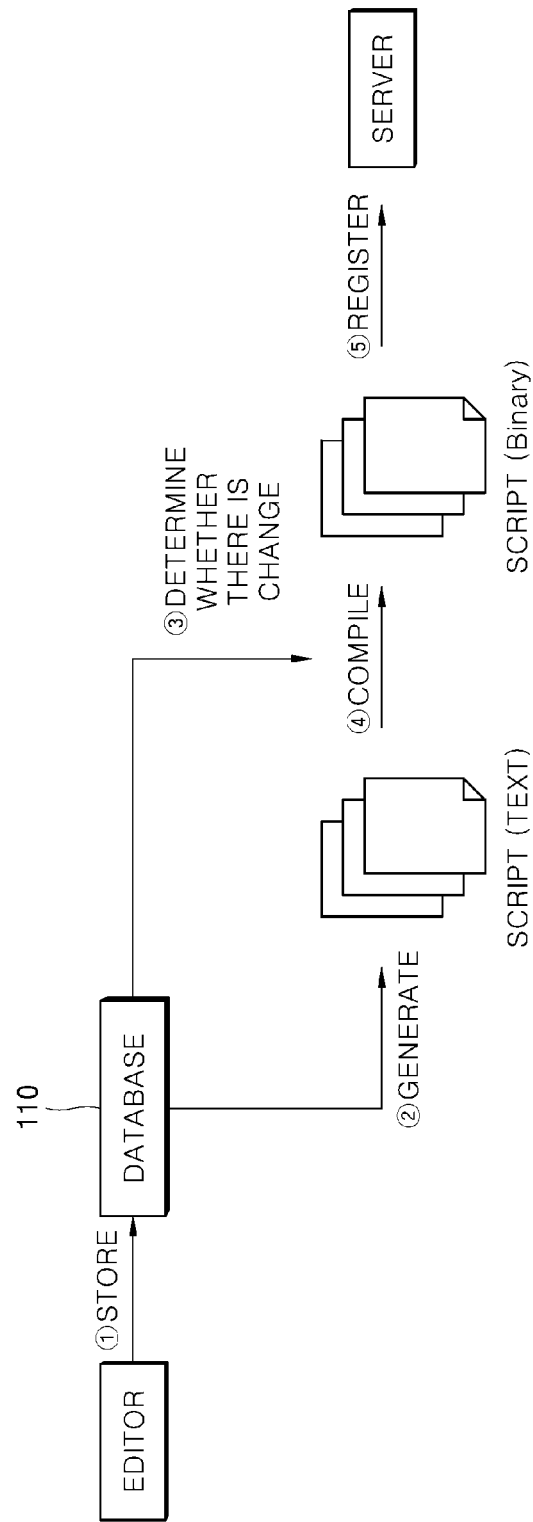
FIG. 4 is a diagram illustrating a process of compiling a script according to an exemplary embodiment of the present disclosure.

FIG. 4 is a diagram illustrating a process of compiling a script according to an exemplary embodiment of the present disclosure. Hereinafter, a process of compiling a script according to an exemplary embodiment of the present disclosure will be described in detail with reference to FIG. 4.

Referring to FIG. 4, the power data acquired from the power system 310 may be input to the database 110 via an editor. The database 110 may assign an index to each power data and store it (①). The script may be generated in a text format TEXT using the power data stored in the database 110 (②).

The script in a text format may be compiled into a script in a binary format (④) after it is determined that the index of the power data stored in the database 110 has been changed (③). More specifically, if the index of the power data stored in the database 110 has been changed, the script in a text format may be compiled by referring to the index of the changed power data. If the index of the power data stored in the database 110 has not been changed, the script in a text format may be compiled by referring to the index of the existing power data.

The script in the form of compiled binary format may be registered with the server 320 and managed by the user (⑤). For example, when the apparatus is employed by a SCADA system, the server 320 may be linked to an HMI that is connected to software in the SCADA system and provides analysis functions using various data generated during the process. The user may manage the script in the form of binary format registered with the server 320 via the HMI.

FIG. 5 is a table showing version information corresponding to power data and index of power data. Hereinafter, a database 110, a script generating unit 120, a determining unit 130 and a compiling unit 140 according to another exemplary embodiment of the present disclosure will be described in detail with reference to FIGS. 2 and 5.

Referring to FIG. 5, the database 110 according to this exemplary embodiment of the present disclosure may further store version information corresponding to power data and index of power data. The version information may be set according to whether or not power data and the index of the power data have been changed.

For example, if the power data stored in the database 110 at first is Data 1 and the index assigned to Data 1 is Index 1, the database 110 may further store Version 1, which is version information corresponding to Data 1 and Index 1. In this manner, whenever power data or the index of the power data is changed, the database 110 may store the power data, the index and the version information in association with one another.

The script generating unit 120 according to this exemplary embodiment of the present disclosure may generate a script based on the power data corresponding to the version information stored in the database 110. Referring again to FIG. 5, the script generating unit 120 may generate a script based on Data 1 corresponding to Version 1, and may generate a script based on Data 2 corresponding to Version 2. By generating scripts in this manner, the script generating unit 120 may generate the scripts based on the past power data as well as the updated power data in the database 110.

In other words, the database 110 according to the exemplary embodiment of the present disclosure accumulates and stores the power data for each version, so that the user can easily monitor the history of the changed power data. In addition, the script generating unit 120 generates a script of specific version by referring to power data accumulatively stored for each version, so that even if an error occurs in the script of an updated version, it can be easily recovered to the past script.

The determining unit 130 according to this exemplary embodiment of the present disclosure may determine whether the index of the power data has been changed by referring to the version information. More specifically, the version information may be set differently as power data and the index of the power data change. Accordingly, the determining unit 130 may receive the version information only, and may determine that the index of the power data has been changed if the version information is different from the existing version information.

The compiling unit 140 according to another exemplary embodiment may compile the script by referring to the index of the power data corresponding to the version information. Referring again to FIG. 5, the compiling unit 140 may compile a script based on Index 1 corresponding to Version 1, and may compile a script based on Index 2 corresponding to Version 2. By compiling scripts in this manner, the compiling unit 140 may compile the scripts based on the past index as well as the index of updated power data in the database 110.

As described above, according to the exemplary embodiment of the present disclosure, by using the version information corresponding to power data and the index of the power data, it is possible to easily recover the script.

Figure 6:
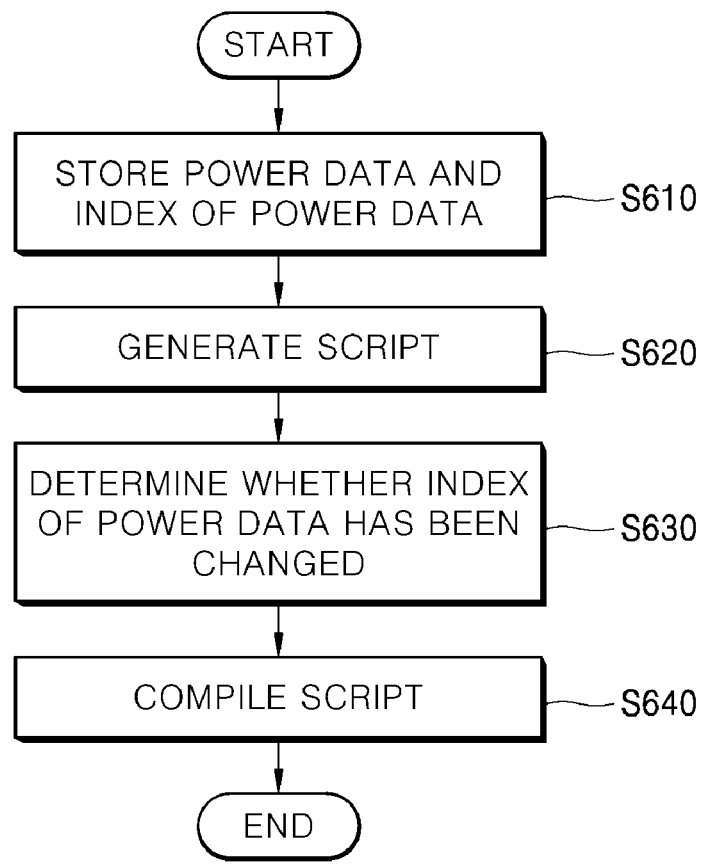
FIG. 6 is a flowchart illustrating a method for compiling scripts according to an exemplary embodiment of the present disclosure.

FIG. 6 is a flowchart illustrating a method for compiling scripts according to an exemplary embodiment of the present disclosure. Hereinafter, the method for compiling scripts according to the exemplary embodiment of the present disclosure will be described in detail with reference to FIG. 6.

Referring to FIG. 6, the method includes storing power data acquired from the power system 310 and an index of power data (S610), and generates a script based on the stored power data (S620). Subsequently, the method includes determining whether or not the index of the stored power data has been changed (S630), and compiling the script by referring to a predetermined instruction based on the determination result (S640).

The step S610 may be identical to the method described in the database 110 shown in FIG. 2, and the step S620 may be identical to the method described in the script generating unit 120 shown in FIG. 2. In addition, the step S630 may be identical to the method described in the determination unit 130 shown in FIG. 2, and the step S640 may be identical to the method described in the compiling unit 140 shown in FIG. 2.

Figure 7:
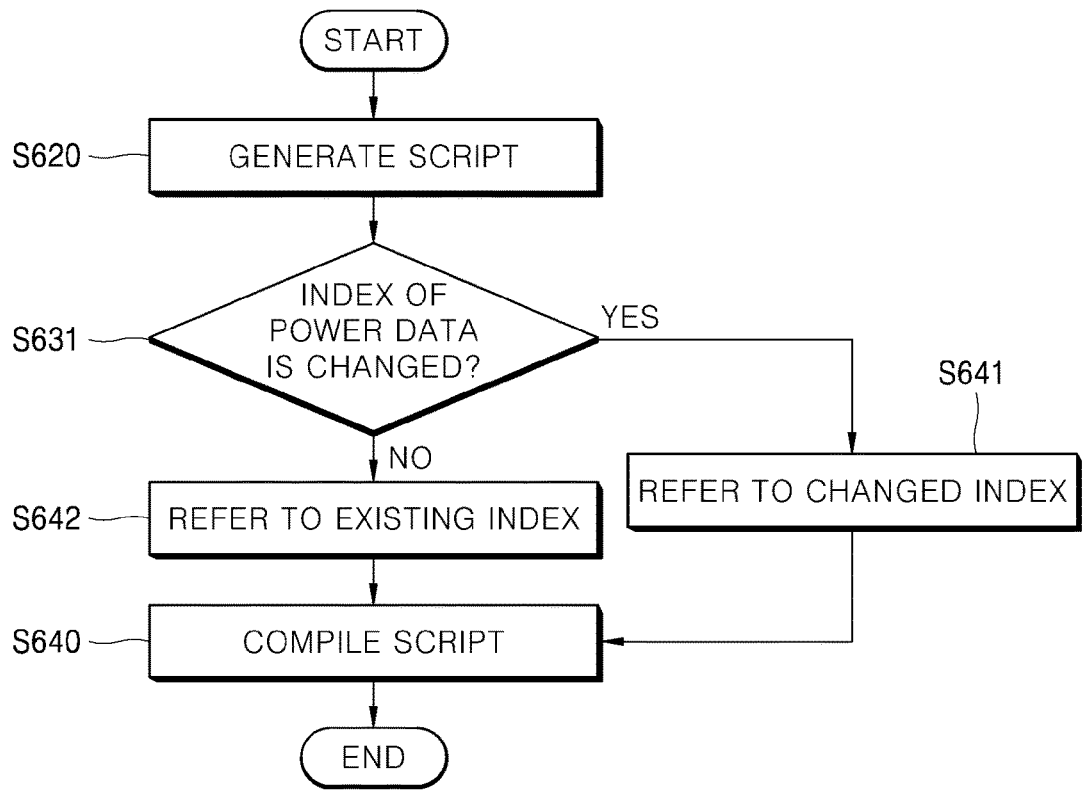
FIG. 7 is a flowchart illustrating a process of determining whether an index of power data has been changed according to an exemplary embodiment of the present disclosure.

FIG. 7 is a flowchart illustrating a process of determining whether an index of power data has been changed according to an exemplary embodiment of the present disclosure. Hereinafter, a method of determining whether an index of power data has been changed will be described in detail below with reference to FIG. 7.

Referring to FIG. 7, the method includes generating a script based on power data (S620), and determining whether the index of the power data has been changed (S631). If the index of the power data has been changed, the method includes referring to the changed index (S641) and compiling the script (S640). On the other hand, if the index of the power data is not changed, the method includes referring to the existing index (S642), and compiling the script (S640).

The step S631 may be identical to the method described in the determination unit 130 shown in FIG. 2, and the steps S641 and S642 may be identical to the method described in the compiling unit 140 shown in FIG. 2.

The present disclosure described above may be variously substituted, altered, and modified by those skilled in the art to which the present invention pertains without departing from the scope and sprit of the present disclosure. Therefore, the present disclosure is not limited to the above-mentioned exemplary embodiments and the accompanying drawings.

What is claimed is:

1. An apparatus employed in a supervisory control and data acquisition (SCADA) system for compiling scripts, comprising:

- a database configured to store, via a processor and a memory, power data acquired from a power system and an index of the power data;
- a script generating unit configured to generate, via the processor, a script based on the power data stored in the database;
- a determining unit configured to determine, via the processor, whether the index of the power data stored in the database has been changed; and
- a compiling unit configured to compile, via the processor, the script generated in the script generating unit based on the determination result,
- wherein the database is further configured to store version information corresponding to the power data and the index of the power data,
- wherein the version information is set according to whether the power data and the index of the power data have been changed,
- wherein the script generating unit generates a script based on the power data corresponding to the version information,
- wherein, if an error occurs in the script, the script generating unit recovers a previous script stored in the database corresponding, according to the version information, to a previous version of the script, and
- wherein, if it is determined that the index of the power data has been changed, the compiling unit compiles only a part of an already-generated script that is generated based on the power data with the changed index by referring to the changed index of the power data.

2. The apparatus of claim 1, wherein, if it is determined that the index of the power data has been changed, the compiling unit compiles the generated script by referring to the changed index of the power data.

3. The apparatus of claim 1, wherein the determining unit determines whether the index of the power data has been changed by referring to the version information.

4. The apparatus of claim 1, wherein the index of the power data comprises information on at least one of a name, a size, an attribute and a log location of the power data.

* * * * *